United States Patent [19]

Perron et al.

[11] Patent Number: 5,165,263
[45] Date of Patent: Nov. 24, 1992

[54] VALVE LOCK

[76] Inventors: Claude Perron, 1700, boul. des Laurentides, St. Boniface, Canada, G0X 2L0; Mario Primeau, 8710 Marjolaine Street, St. Léonard, Canada, H1R 2H2

[21] Appl. No.: 822,216

[22] Filed: Jan. 17, 1992

[51] Int. Cl.$^5$ .............................. F16K 35/00
[52] U.S. Cl. .................... 70/177; 70/180; 70/203; 70/212; 137/385
[58] Field of Search ............... 70/202, 203, 211, 212, 70/175–180; 137/385

[56] References Cited

U.S. PATENT DOCUMENTS

| | | | |
|---|---|---|---|
| 748,720 | 1/1904 | Glazier | 70/178 |
| 1,590,032 | 6/1926 | Jauch | 70/177 |
| 2,377,036 | 5/1945 | Quarfoot | 70/178 |
| 2,667,864 | 2/1954 | Marx | 70/177 |
| 3,960,168 | 6/1976 | Plympton | 137/385 |
| 3,980,099 | 9/1976 | Youngblood | 137/385 X |
| 4,041,738 | 8/1977 | Vann | 70/212 |
| 4,498,320 | 2/1985 | Mullis | 70/177 |
| 4,630,456 | 12/1986 | Nielsen, Jr. | 70/178 X |
| 5,003,797 | 4/1991 | Wirth et al. | 70/180 |
| 5,035,128 | 7/1991 | Ridgway | 70/211 |

FOREIGN PATENT DOCUMENTS

| | | | |
|---|---|---|---|
| 1041315 | 10/1978 | Canada . | |
| 1095605 | 12/1960 | Fed. Rep. of Germany | 137/385 |
| WO83/02812 | 8/1983 | PCT Int'l Appl. | 137/385 |
| 2212599 | 7/1989 | United Kingdom | 137/385 |

*Primary Examiner*—Lloyd A. Gall
*Attorney, Agent, or Firm*—Pierre Lespérance; Francois Martineau

[57] ABSTRACT

The locking device locks the valve control lever in both its closed or open positions. It consists of a male part and a female part. The male part includes a lengthwise cavity, for flatly and freely receiving the valve lever, and a U-shape extension, transversely extending from one end of the male part main body. The female part defines a channel for sliding engagement by the interconnected male part and valve lever, to interlock same. A padlock interlocks the male and female parts by engaging registering ears thereof.

4 Claims, 9 Drawing Sheets

VALVE LOCK

FIELD OF THE INVENTION

This invention relates to safety locks for preventing unauthorized actuation of the valve lever of a fluid conduit.

BACKGROUND OF THE INVENTION

Fluid flow in industrial machinery conduits are usually controlled by a manual control valve provided with an outwardly projecting lever handle. The fluid, e.g. hydraulic fluid, is fed to the machinery to power same. The handle is transversely mounted to the valve about a pivotal axle for rotation between an "open" position, usually parallel to and in direct register with the conduit, and a "closed" position, usually orthogonal to the conduit. In the handle closed position, the valve gate is positioned transverse to the lengthwise axis of the conduit, wherein fluid flow is positively prevented therethrough. In the handle open position, the valve gate is positioned axially of the conduit, wherein fluid flow thereabout is substantially unhampered.

During maintenance of the fluid-fed machinery, it is essential not only to close the valve, but also to make sure that the valve remain closed at all time. Indeed, maintenance crewmen of large industrial machines may become severely injured and eventually sustain permanent disabilities or even be killed, if the valve is accidentally opened during machine maintenance work downstream of that valve. It is thus critical that the worker's machine maintenance protocol includes as a first step the releasable installation of a valve lock onto the valve by a maintenance crewman, before work downstream of the valve begins.

A review of prior art discloses that such valve locks exist. Such valve locks are devised to deter an accidental opening of the valve, e.g. by a fellow worker in the plant not aware that maintenance is currently being made on the machinery. However, these known valve locks are not intended to prevent a criminal from tampering with the valve in view of intentionally inducing bodily harm to the maintenance crewmen. Accordingly, their hardness is relatively small.

Typical of such valve locks is the one disclosed in U.S. Pat. No. 5,003,797 issued Apr. 2, 1991 to the W. H. Brady Company. The Brady valve locking device including a main, rigid, single planar body 25 provided with an inner channel member 30, to be engaged by the valve handle 12. An integral diverging leg 26 depends from the main body 25 of the lock. In the closed position of the valve handle, upon engagement of handle 12 into channel 30, leg 26 comes to flatly abut tangentially against the valve body 15 (the latter is coaxial to the fluid conduit 11). As shown in FIG. 6 of the Brady patent, locking action is obtained by pivoting arm 31 toward valve lever 12 and by engaging a padlock shackle into one of the bores 34, so as to wedge flange 28 against conduit 11. Of course, such a locking device is limited to locking the valve handle 12 in a closed position only.

U.S. Pat. No. 4,498,320 issued in February 1985 to Conbraco industries, inc., discloses a valve handle locking device consisting of two parts. This valve lock can lock the valve handle in both its closed or open position. But, as clearly suggested in FIG. 3, each time the two part lock 34, 36 is to be installed to the handle lever 24, a nut 30 has to be removed and then reinserted onto the rotatable valve shaft 22 of handle lever 24. This is cumbersome.

Canadian Patent 1,041,315 issued in 1978 to the Whitey Research Tool company, also discloses a two part valve handle lock, which can lock the valve handle in both a closed position or an open position. Again, as in the Conbraco patent, in order to install the two parts 52, 54 of the locking device onto the handle 56, the nut 16 connecting the handle 56 to the valve axle 12 has to be removed and then reinstalled.

OBJECTS OF THE INVENTION

The gist of the invention is therefore to provide a fluid conduit valve control lock for locking in both open or closed positions a valve handle, wherein the lock can be easily installed onto the valve handle without having to dismantle any valve or valve handle component.

A general object of the invention is to provide a valve lock as above-noted, of simple construction and low manufacturing cost.

SUMMARY OF THE INVENTION

Accordingly with the objects of the invention, there is disclosed a locking device for use with an elongated valve control handle lever of the type being endwisely mounted radially of a lengthwise fluid flow conduit for pivotal rotation between a first position, parallel to and in register with said conduit, and a second position, transverse to said conduit; said locking device consisting of: (a) an elongated male member, defining a main body freely engaged over said valve lever lengthwisely thereof; (b) an elongated female member, defining a channel member releasably engaged by the freely interengaged said male member and said valve lever for interlocking said male member and said valve lever; (c) means for preventing relative movement of said valve lever locked male member about said conduit; and (d) means for releasably anchoring said male and female members exclusively of said handle lever; wherein said locking device prevents pivotal rotation of said valve lever when the latter is positioned in either one of said first or second positions.

BRIEF DESCRIPTION OF THE DRAWINGS

FIG. 5 is a cross-section about line 5—5 of FIG. 4a;

FIGS. 8-10 are partial perspective view of the handle adjustment plate fitted inside the valve lock device to secure two differently shaped valve handle levers.

DETAILED DESCRIPTION OF THE INVENTION

Figure 1:
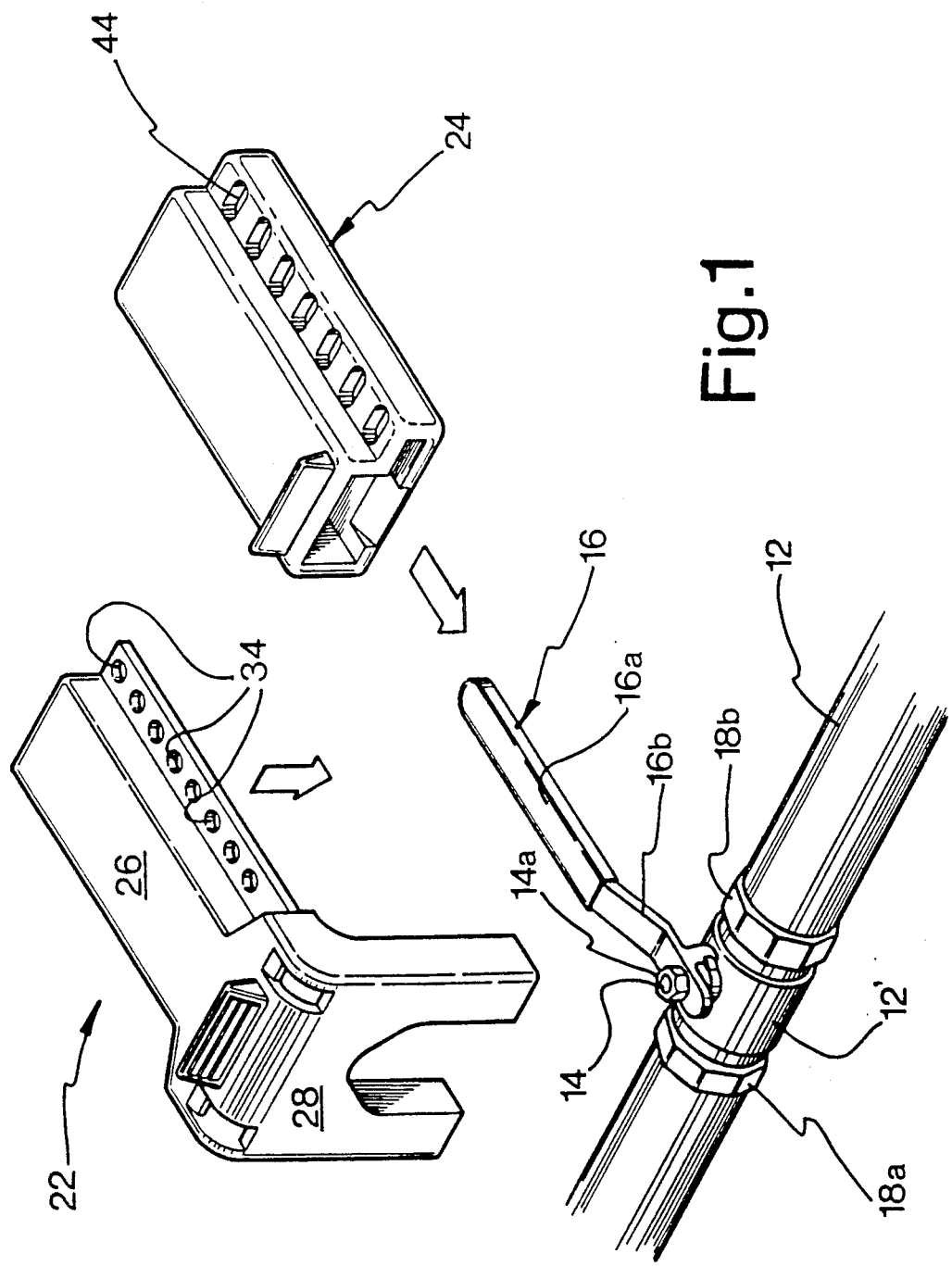
FIGS. 1-3 are isometric views of a fluid flow conduit segment, provided with an intermediate control valve lever, and suggesting how a first embodiment of the two-piece lock device of the invention can be sequentially mounted onto the valve lever to lock same in transverse position relative to the conduit, FIG. 3 being at an enlarged scale and further showing a padlock interlocking the two parts of the present locking device.

Fluid flow through cylindrical conduit 12 is controlled by a valve (not shown) mounted into a section 12' of conduit 12. Conduit section 12' may be a separate part of conduit 12, in which case a pair of spaced, annular screw nuts 18a, 18b threadedly interlock conduit section 12' to the two halves of conduit 12 in fluid-tight fashion. The discoid valve is pivotally carried to conduit section 12' by a rotatable axle bolt 14, which projects radialy outwardly from conduit 12. An elongated, rigid, lever arm 16 is transversely carried in rotatably pivotal fashion by the radially outer end of valve axle 14, and fixedly retained thereto by the head 14a of bolt 14. A plastic sheath 16a may fit the free end portion of lever 16, for increased comfort in manual handling thereof. The inner end 16b of lever 16 may be slightly bent to offset handle 16a from the plane of conduit 12.

Figure 2:
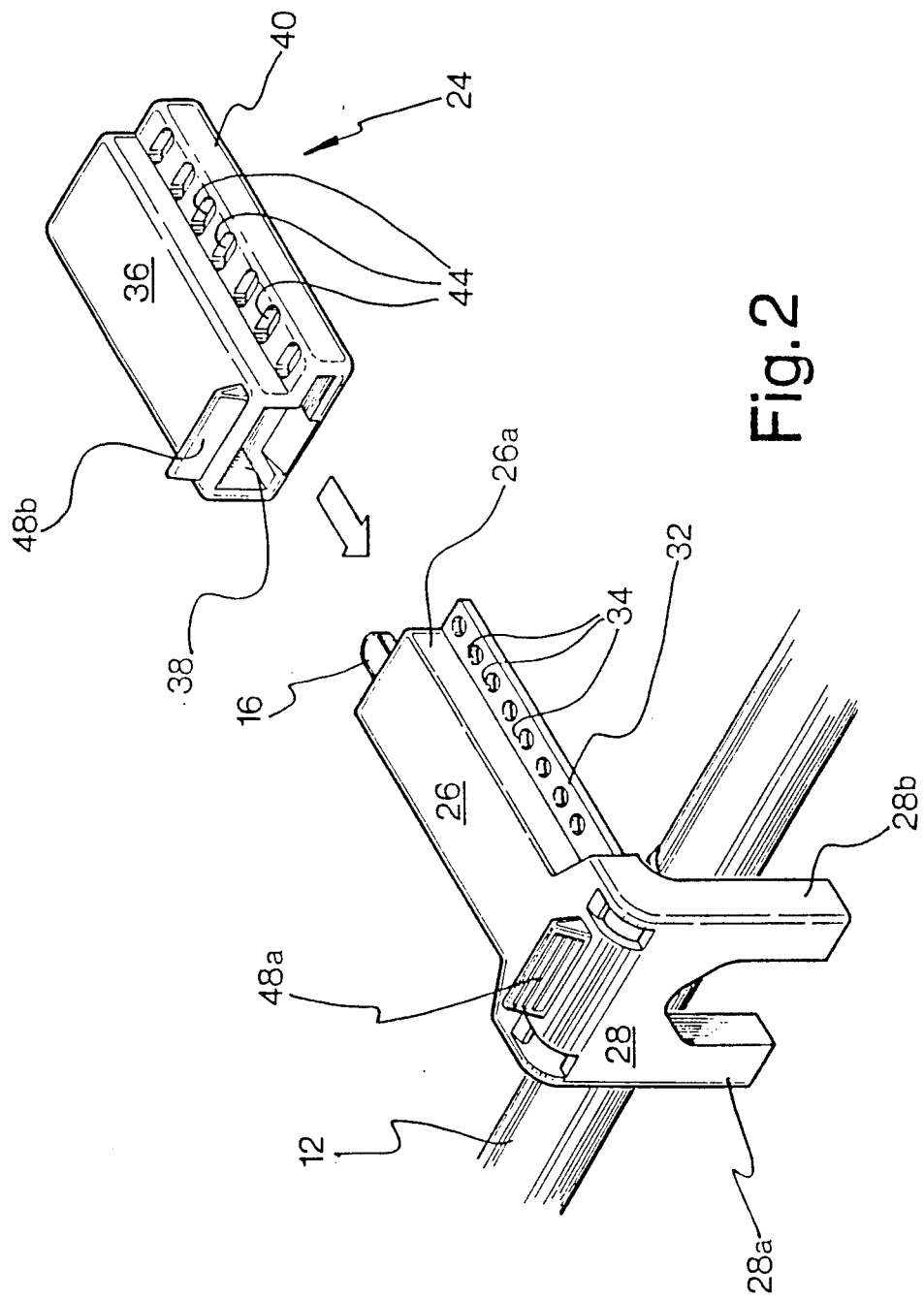
Figure 3:
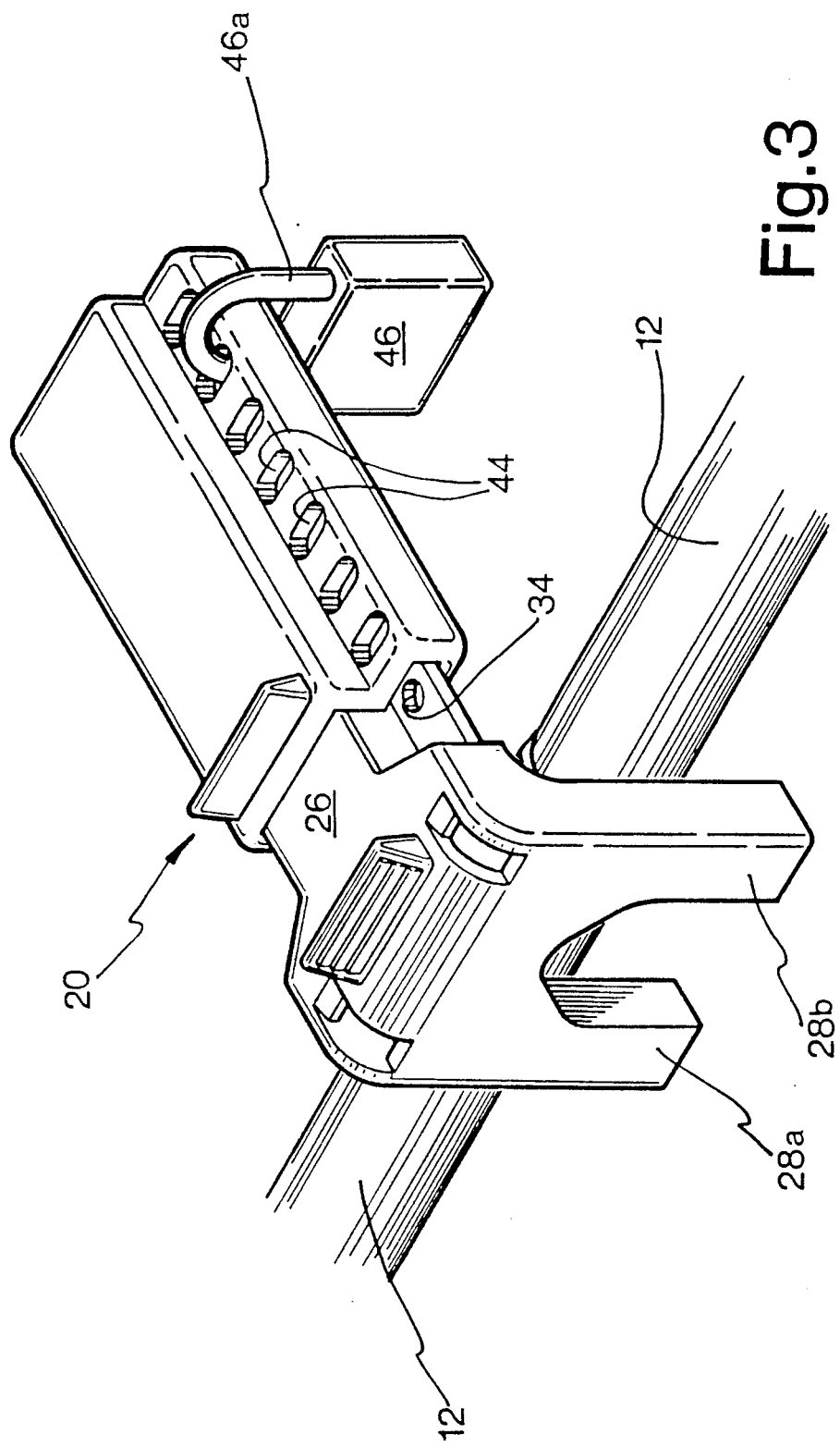
Figure 6:
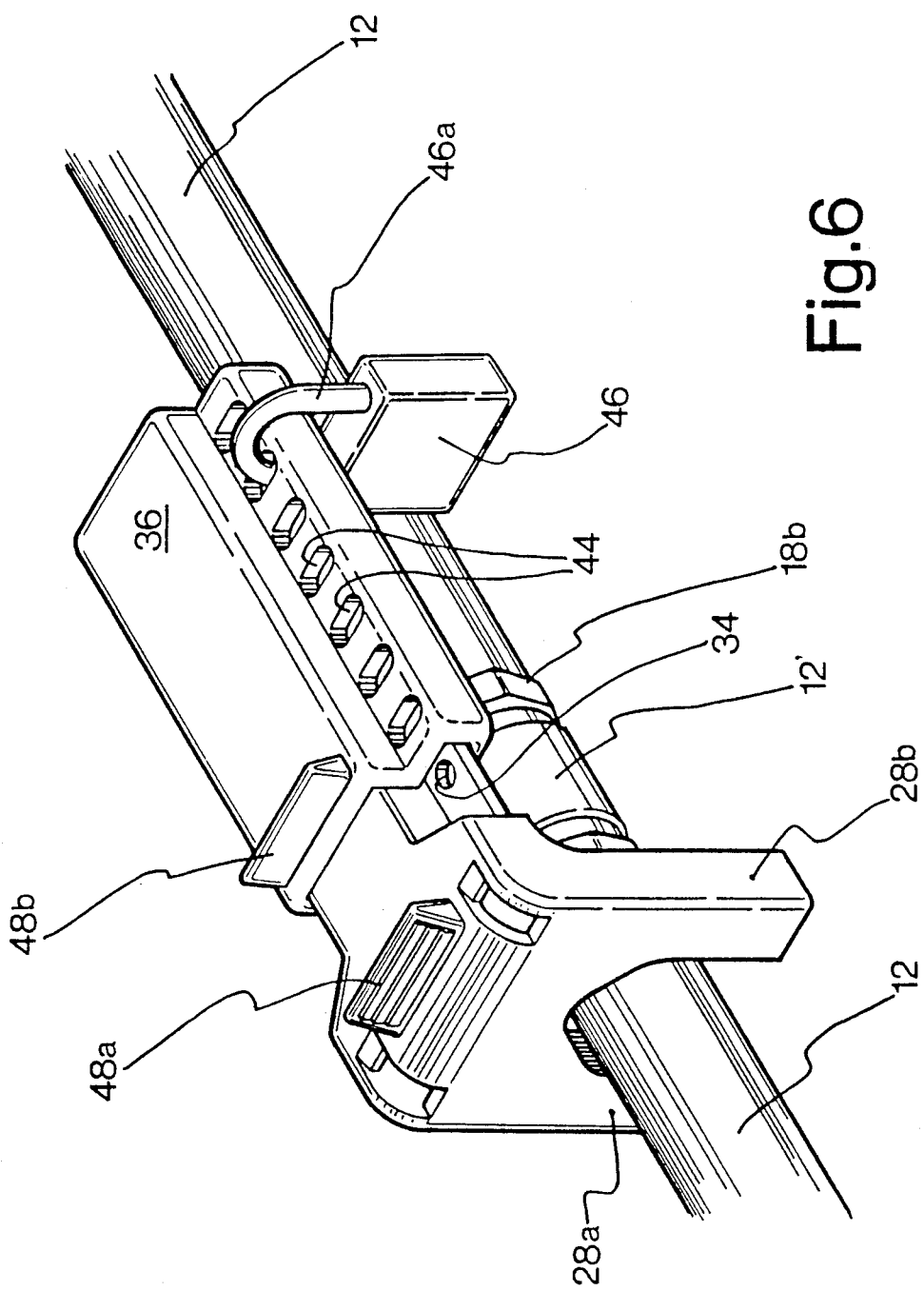
FIG. 6 is a view similar to FIG. 3 but alternately showing how the valve lever can be locked in lengthwise position relative to the conduit.

Lever arm 16 is rotatable with axle 14 between a first position transverse to the lengthwise axis of conduit—FIGS. 1-3—to a second position parallel to and in register with the conduit 12—FIG. 6. In the first position of lever 16, the valve is usually closed: its flat discoid body extends radially of the section of conduit 12, preventing flow of fluid therethrough. In said second position of lever 16, the valve is then opened: the plane of its flat body extends generally parallel to the lengthwise axis of conduit 12, thus allowing the fluid to flow unhampered along the conduit 12.

According to the invention, there is provided means 20 to lock the valve control lever 16 in either its first (transverse) position or its second (lengthwise) position. Lock means 20 consists of two separate mating parts, namely: a male coupling part 22 and a female coupling part 24.

Male coupling part 22 defines an elongated plate or shaft 26, provided with edgewise flanges 26a, 26a so as to be of generally U-shape in cross-section, and a U-shape stopper 28, endwisely integral to and transversely dependent from shaft 26. Stopper 28 is much wider than shaft 26, and the latter defines a lengthwise U-channel 30 (FIG. 5) much wider than lever arm 16 for free engagement thereover. The length of shaft 26 is such that, as channel 30 engages flatly onto a substantial portion of lever 16, stopper 28 extends transversely of conduit 12 on the side opposite lever 16. The two legs 28a, 28b of U-shape stopper 28 are spaced by a distance greater than the diameter of conduit 12. Hence, legs 28a, 28b may engage on opposite sides of conduit, when lever 16 extends parallel to conduit 12 (FIG. 6) or on the same side of conduit 12 (FIGS. 1-3) when lever 16 extends transversely of conduit 12.

The relative lengths of lever 16 and shaft 26 may be such that the free end tip of lever 16 may project outwardly from the shaft channel 30, as suggested in FIG. 2. Preferably, stopper legs 28a, 28b are spaced by a distance substantially equal to the length of conduit section 12' inclusive of screw rings 18a, 18b, so that the latter may constitute rails for guiding displacement of stopper legs 28a, 28b tangentially of conduit 12, upon locking lever 16 being in its transverse position shown in FIG. 2. Preferably, an outward flange 32 provided with a number of bores 34 is made integral edgewisely of one long free edge of a flange 26a transversely thereof, for a purpose later set forth.

Female coupling part 24 consists of a flat elongated casing 36 defining a mouth 38 for through engagement by the free end of shaft 26 including lateral edgewise flange 32. The inner hollow of casing 36 generally conforms to the exterior shape of shaft 26 including its flange 32. Accordingly, the length of casing 36 should represent at least a major portion of the length of shaft 26. Casing 36 defines an edgewisely coextensive, cross-sectionally U-shape portion 40 to be lengthwisely engaged by flange 32 in sliding fashion. Each of the two facing legs of the casing U-portion 40 includes a number of bores 44, destined to come in register with bores 34 of shaft flange 32. Casing bores 44 are preferably larger in diameter than shaft bores 34.

As suggested in FIG. 3, by inserting the shackle 46a of a padlock 46 through registering bores 34 and 44, casing 36 and shaft 26 become interlocked. Consequently, lever 16 is completely concealed and out of reach from unauthorized persons.

In the transverse position of lever 16 (FIG. 3), stopper 28 of interlocked elements 26, 36 positively locks the latter in a transverse position relative to conduit 12, thus preventing rotation of lever 16, since one of the exterior faces of legs 28a, 28b abut tangentially against the same side of conduit 12 opposite shaft 26. Similarly, in the axial position of lever 16 (FIG. 6), stopper 28 of interlocked elements 26, 36 again positively locks the latter in their axial position—parallel to and overlying the lengthwise axis of conduit 12—thus again preventing rotation of lever 16, since the interior faces of legs 28a, 28b abut tangentially against opposite sides of conduit 12. Hence, in both instances, the valve is locked either in open or closed position.

Preferably, the top wall of stopper 28 includes a tab 48a, and the top wall of casing 36 adjacent mouth 38 also includes a tab 48b, for facilitating handling of valve lock parts 22 and 24.

Figure 4:
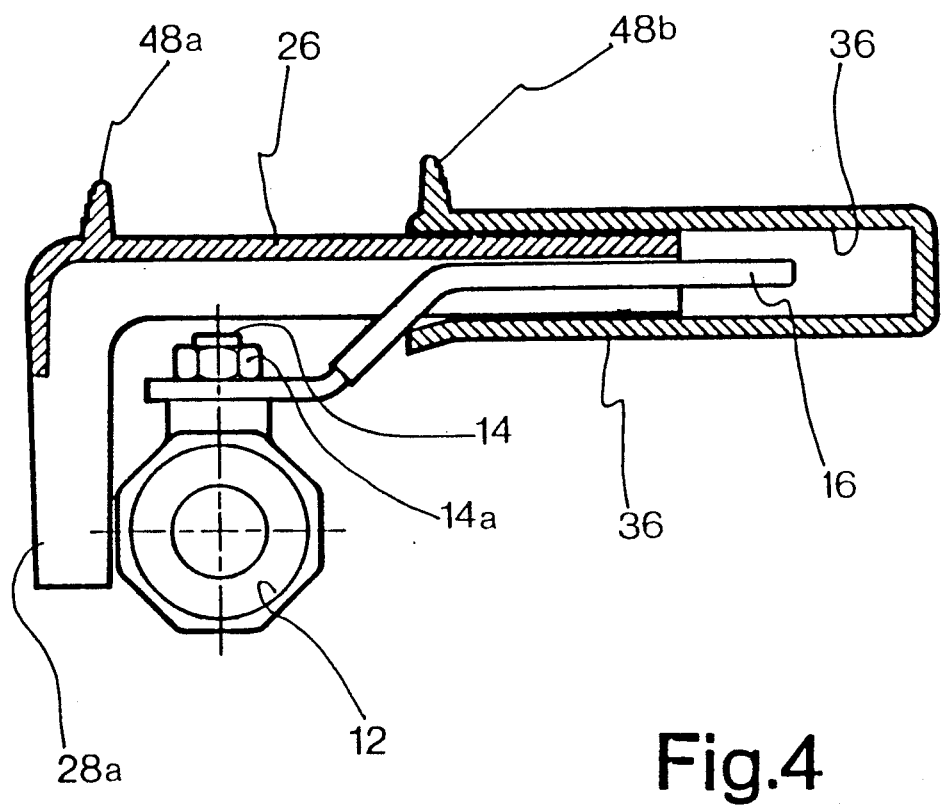
FIG. 4 is a lengthwise sectional view of the valve lock of FIG. 3.
Figure 4A:
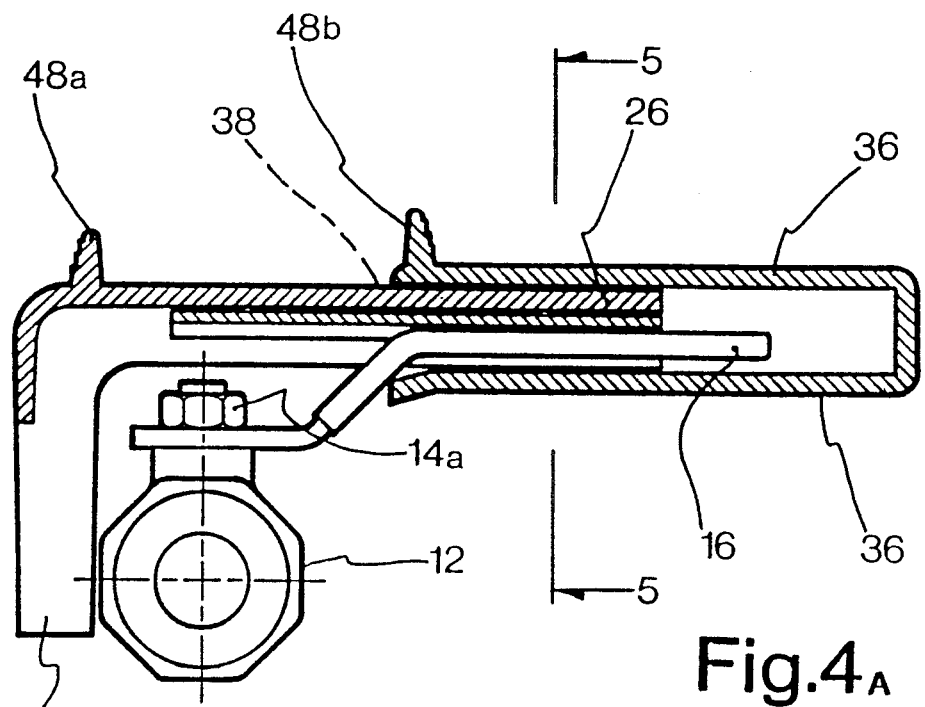
FIG. 4a is a view similar to FIG. 4 but for a second embodiment of valve lock.
Figure 5:
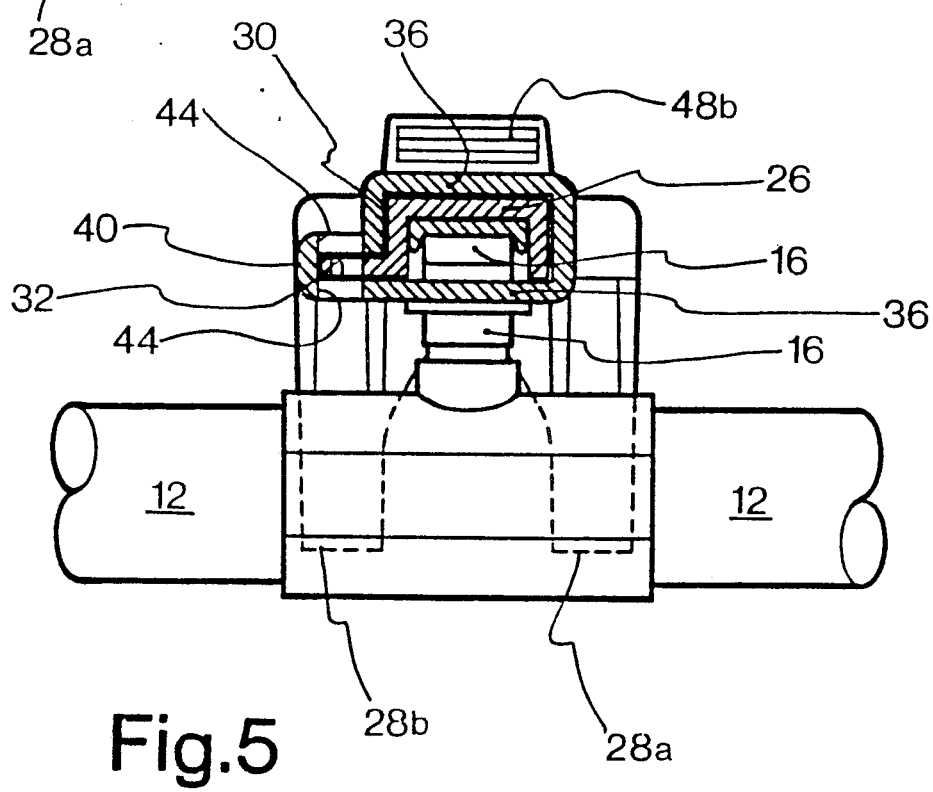
Figure 7:
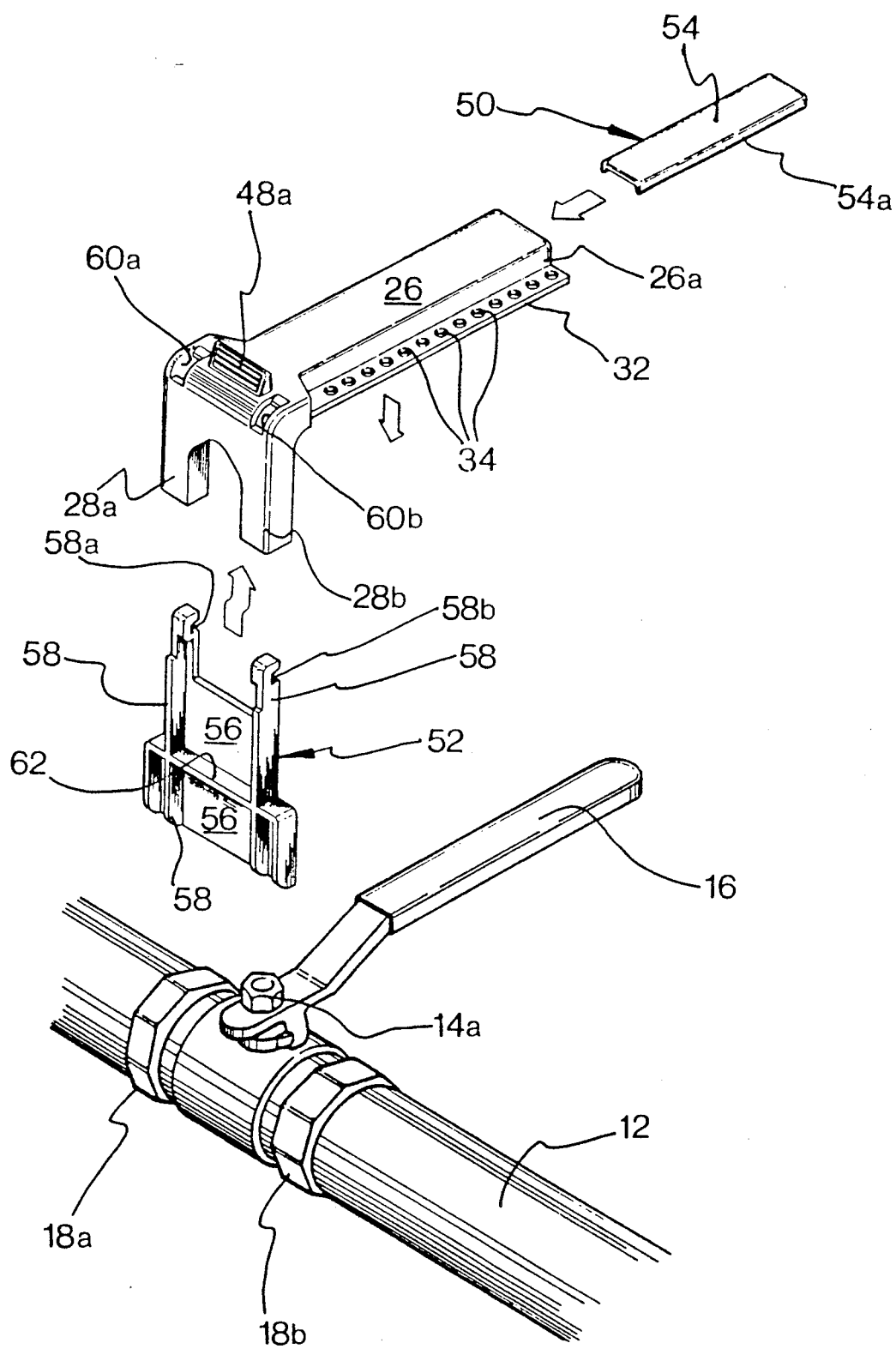
FIG. 7 is an exploded isometric view of a third embodiment of valve lever lock suggesting how it can be mounted onto the transverse valve lever lock of a flow conduit.
Figure 8:
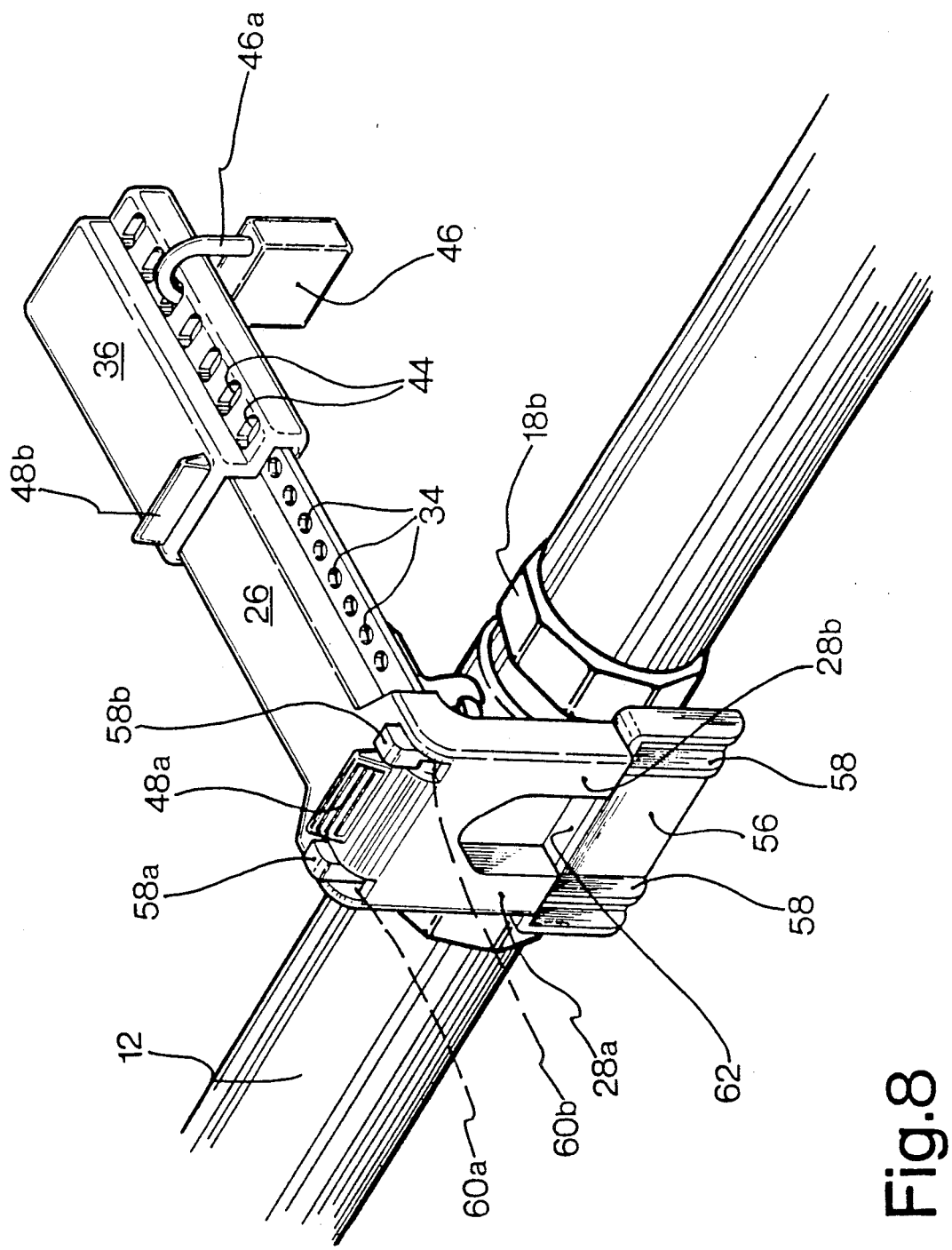
FIG. 8 is a view similar to FIG. 7 but with the lock operatively coupled to the valve lever and padlocked in place.
Figure 9:
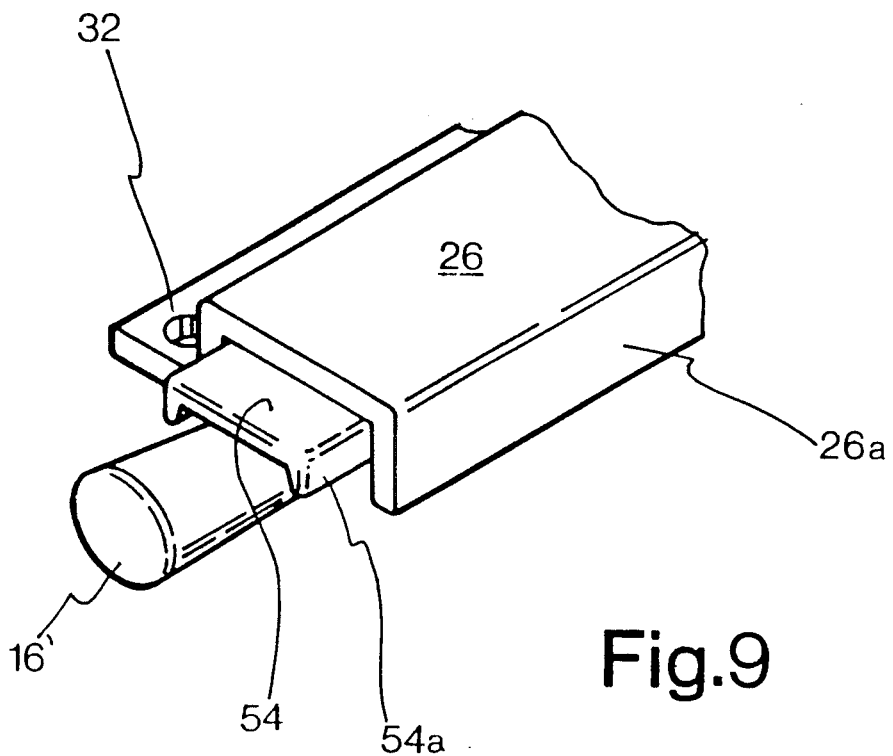
Figure 10:
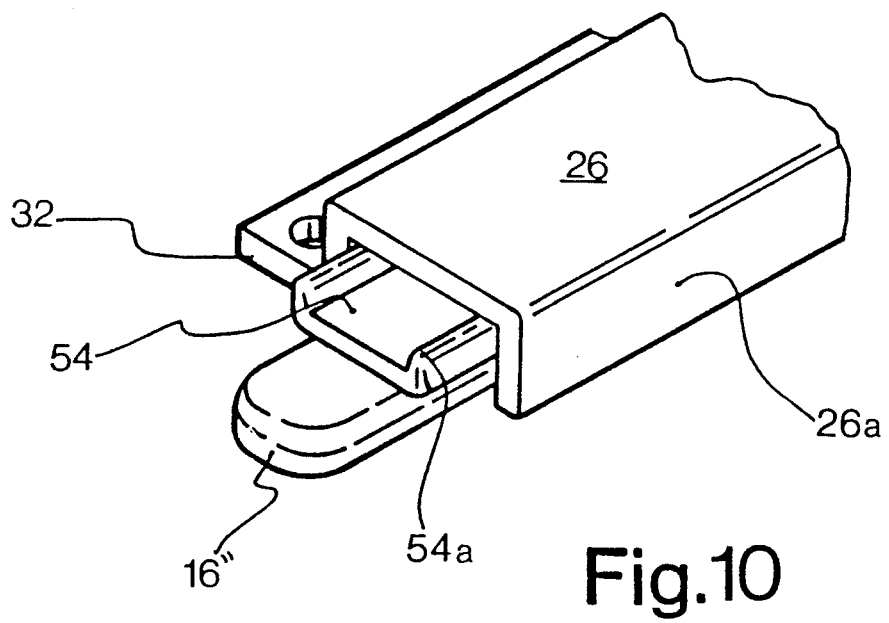

Preferably and as illustrated in FIGS. 4a, 5 and 7, rail members 50, 52 are provided to immobilize handle 16 into shaft channel 36 and stopper legs 28a, 28b against collars 18a, 18b respectively. Rail member 50 defines a flat rectangular plate 54 provided with narrow edgewise flanges 54a, 54a to constitute a U in cross-section. Adjustment rail 50 enables the anchoring of a relatively narrow valve handling lever 16' (FIG. 9) to within channel 38, by having plate 54 abutting flatly against plate 26 with flanges 54a, 54a directed in a direction opposite plate 26. Alternately, rail 50 will also enable anchoring of a relatively thin valve handle lever 16" (FIG. 10) within channel 38, by having plate 54 abut flatly against handle 16" with flanges 54a, 54a edgewisely abutting transversely against plate 26.

Coupler rail member 52 defines a main plate 56 with two coextensive, integral, parallel legs 58, 58 releasably engageable through legs 28a, 28b of stopper 28. The free end of each rail leg 58 forms a hook 58a, 58b respectively. The inner end of each stopper legs 28a, 28b includes a through-bore 60a, 60b. Throughbores 60a, 60b are spaced from each other by the same distance as hooks 58a, 58b are from each other, so as to be hookingly engageable by same. Legs 58 are rectangular and extend transversely of the plane of plate 56 all along its length. Furthermore, another leg 62 similar to legs 58 is provided transversely of the latter at an intermediate section thereof. Leg 62 constitutes a seat for supporting the free ends of stopper legs 28a, 28b upon coupler hook 58a, 58b engaging stopper bores 60a, 60b.

I claim:

1. A locking device for use with an elongated valve control handle lever of the type being endwisely mounted radially of a lengthwise fluid flow conduit for pivotal rotation between a first position, parallel to and in register with said conduit, and a second position, transverse to said conduit; said locking device consisting of:
   (a) a male member, defining an elongated main body for releasably engaging over a substantial portion of said handle lever lengthwisely thereof;
   (b) a female member, defining a generally closed, elongated pocket member, said pocket member having a mouth at one end, the releasably interengaged said male member and said handle lever to be releasably engaged through said mouth into said pocket member for interlocking said male member and said handle lever, wherein said handle lever becomes generally concealed by said male and female members;
   (c) means for preventing relative movement of said male member about said conduit; and
   (d) means for releasably anchoring said male and female members exclusively of said handle lever; wherein said locking device prevents pivotal rotation of said handle lever when the latter is positioned in either one of said first or second positions; wherein said anchoring means includes:
      (a) a flange, edgewisely depending from said male member and defining a number of lengthwisely spaced first bores;
      (b) a cross-sectionally U-shape rail, integrally dependent from one side edge of said female member and slidingly engaged by said flange, and defining a number of lengthwise spaced second bores; and
      (c) a padlock having a shackle releasably engaging a registering pair of said first bore and second bore to interlock said flange to said rail.

2. A locking device for use with an elongated valve control handle lever of the type being endwisely mounted radially of a lengthwise fluid flow conduit for pivotal rotation between a first position, parallel to and in register with said conduit, and a second position, transverse to said conduit; said locking device consisting of:
   (a) a male member, defining an elongated main body for releasably engaging over a substantial portion of said handle lever lengthwisely thereof;
   (b) a female member, defining a generally closed, elongated pocket member, said pocket member having a mouth at one end, the releasably interengaged said male member and said handle lever to be releasably engaged through said mouth into said pocket member for interlocking said male member and said handle lever, wherein said handle lever becomes generally concealed by said male and female members;
   (c) means for preventing relative movement of said male member about said conduit; and
   (d) means for releasably anchoring said male and female members exclusively of said handle lever; wherein said locking device prevents pivotal rotation of said handle lever when the latter is positioned in either one of said first or second positions;
   wherein the first mentioned means consists of a U-shape wall, transversely mounted endwisely of said male member main body, said U-shape wall defining two substantially parallel side legs spaced from each other by a distance at least slightly greater than the diameter of said fluid conduit, said legs of the U-shape wall being at least slightly longer than said fluid conduit diameter.

3. A locking device as defined in claim 2, further including an extension member of said side legs of said U-shape wall, releasably mounted thereto to fit conduits of very large diameter.

4. A locking device for use with an elongated valve control handle lever of the type being endwisely mounted radially of a lengthwise fluid flow conduit for pivotal rotation between a first position, parallel to and in register with said conduit, and a second position, transverse to said conduit; said locking device consisting of:
   (a) a male member, defining an elongated main body for releasably engaging over a substantial portion of said handle lever lengthwisely thereof;
   (b) a female member, defining a generally closed, elongated pocket member, said pocket member having a mouth at one end, the releasably interengaged said male member and said handle lever to be releasably engaged through said mouth into said pocket member for interlocking said male member and said handle lever, wherein said handle lever becomes generally concealed by said male and female members;
   (c) means for preventing relative movement of said male member about said conduit; and
   (d) means for releasably anchoring said male and female members exclusively of said handle lever; wherein said locking device prevents pivotal rotation of said handle lever when the latter is positioned in either one of said first or second positions;
   with said male members being of generally U-shape, defining a first web and two first side legs; said locking device further including a wedge plate, of cross-sectionally U-shape and defining a second web and two second side legs, said wedge plate releasably mounted between said handle lever and said male member for frictionally interlocking means wherein said handle lever is relatively underdimensioned; said male member thus defining a inner U-shape wall of a dimension approximately that of the outer U-shape wall defined by said wedge plate; wherein for a relatively narrow handle lever, said second web abuts directly against both said first web and said handle lever with said second side legs extending freely in a direction opposite said first web; or wherein for a relative thin handle lever, said second web abuts directly against said handle lever only with said second side legs extending toward and edgewisely engaging said first web.

* * * * *